United States Patent
Suryanarayana et al.

(10) Patent No.: US 12,530,466 B2
(45) Date of Patent: Jan. 20, 2026

(54) INTELLIGENT PRE-BOOT INDICATORS OF VULNERABILITY

(71) Applicant: Dell Products L.P., Round Rock, TX (US)

(72) Inventors: Shekar Babu Suryanarayana, Bangalore (IN); Virupakshi Channagiri Manjunath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 17/875,721

(22) Filed: Jul. 28, 2022

(65) Prior Publication Data
US 2024/0037242 A1    Feb. 1, 2024

(51) Int. Cl.
G06F 21/57    (2013.01)
G06F 21/51    (2013.01)
G06F 21/56    (2013.01)

(52) U.S. Cl.
CPC ............ G06F 21/577 (2013.01); G06F 21/51 (2013.01); G06F 21/566 (2013.01); G06F 21/572 (2013.01)

(58) Field of Classification Search
CPC ............ G06F 21/50; G06F 21/57–575; G06F 21/577; G06F 21/566
See application file for complete search history.

(56) References Cited

U.S. PATENT DOCUMENTS

| | | | |
|---|---|---|---|
| 11,281,768 B1* | 3/2022 | Raman | G06F 21/57 |
| 11,537,716 B1* | 12/2022 | Choudhary | H04L 63/14 |
| 2015/0324588 A1* | 11/2015 | Locke | G06F 21/562 |
| | | | 713/2 |
| 2019/0332392 A1* | 10/2019 | Pant | H04L 9/3213 |
| 2021/0026967 A1* | 1/2021 | Suryanarayana | G06F 21/575 |
| 2021/0081536 A1* | 3/2021 | Zhang | G06F 11/3656 |
| 2021/0392151 A1* | 12/2021 | Lakhani | H04L 63/20 |
| 2023/0315913 A1* | 10/2023 | Chandra | G06F 21/575 |
| | | | 726/26 |

* cited by examiner

Primary Examiner — Hadi S Armouche
(74) Attorney, Agent, or Firm — Jackson Walker L.L.P.

(57) ABSTRACT

A disclosed method provides a Device Integrity and Zero Trust (DIZ) protocol to implement proactive as well as reactive firmware vulnerability management. The DIZ protocol identifies device-level firmware versions and vulnerabilities and dynamically compiles appropriate firmware updates. The protocol may further construct a telemetry of the security vulnerability statistics for dynamic identification of Signs of Compromise (SoC) and collectively interpret various other platform telemetry stats for compiling vulnerability resolutions. An artificial intelligence (AI) based scalable and continuous Adaptive and Trust Assessment (ATA) method is employed for dynamic integration of partner solutions based on threat intelligence and remediation data. Disclosed solutions may further implement a geo location independent security adaption method. The identification and assessment of SoCs beneficially reduces an attacker's ability to breach an organization's IT systems. The DIZ protocol weeds out low-risk items from telemetry stats, and intelligently focuses on items most in need of remediation.

18 Claims, 5 Drawing Sheets

INTELLIGENT PRE-BOOT INDICATORS OF VULNERABILITY

TECHNICAL FIELD

The present disclosure relates to information handling systems and, more particularly, managing vulnerabilities associated with such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems and information handling resources rely on some form of firmware, which may be broadly defined as software providing low-level control for a system's specific hardware. Basic input/output system (BIOS) code is a well-known example of firmware. Unauthorized modifications of firmware represent a significant category of information handling system vulnerability. While Intel, AMD, and other silicon vendors may discover and disclose new vulnerabilities from time to time, businesses and other organizations may exhibit various degrees of diligence with respect to regularly upgrading BIOS/Firmware versions of their systems, thereby potentially resulting in a gap in versions and causing severe damage to the organization.

In addition, variances in device configurations and lack of knowledge of the hardware included in each device make it difficult for customer security and information technology (IT) departments to accurately assess the impact of Common Vulnerabilities and Exposures (CVE) to their organization.

Currently, there is no intelligent method available to dynamically check if an upgraded BIOS version includes the latest security fixes released by CPU vendors like Intel/AMD.

SUMMARY

Disclosed herein are teachings for various methods, systems, and/or other solutions addressing issues identified in the preceding remarks.

In one aspect, a method disclosed herein provides a Device Integrity and Zero Trust (DIZ) protocol to implement proactive as well as reactive firmware vulnerability management. The DIZ protocol identifies device-level firmware versions and vulnerabilities and dynamically compiles appropriate firmware updates. The protocol may further construct a telemetry of the security vulnerability statistics for dynamic identification of Signs of Compromise (SoC) and collectively interprets various other platform telemetry stats for compiling vulnerability resolutions.

In at least some embodiments, an artificial intelligence (AI) based scalable and continuous Adaptive and Trust Assessment (ATA) method is employed for dynamic integration of partner solutions, e.g., Intel/AMD, Carbon Black, Secure works, VMWare, etc., based on threat intelligence and remediation data. Disclosed solutions may further implement a geo location independent security adaption method.

The identification and assessment of Signs of Compromise beneficially reduces an attacker's ability to breach an organization's IT systems, resulting in a better understanding of assets, their vulnerabilities, and the overall risk to an organization. In addition, the DIZ protocol advantageously aids in weeding out low-risk items from telemetry stats, and intelligently focuses on items most in need of remediation, thus saving the organization time and money. The disclosed identification of signs of compromise results in early awareness of vulnerabilities and other problems, thus helping to establish a business risk/benefit curve and optimize security expenses and minimize data damage.

Disclosed teachings include and integrate at least three benefits. The DIZ protocol provides reactive and proactive firmware vulnerability management to stay on top of vulnerability solutions in a safe manner. The dynamic SoC identification method substantially reduces the ability of attackers to breach an organization's IT assets. The ATA method dynamically integrates partner solutions for end-to-end product remediation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
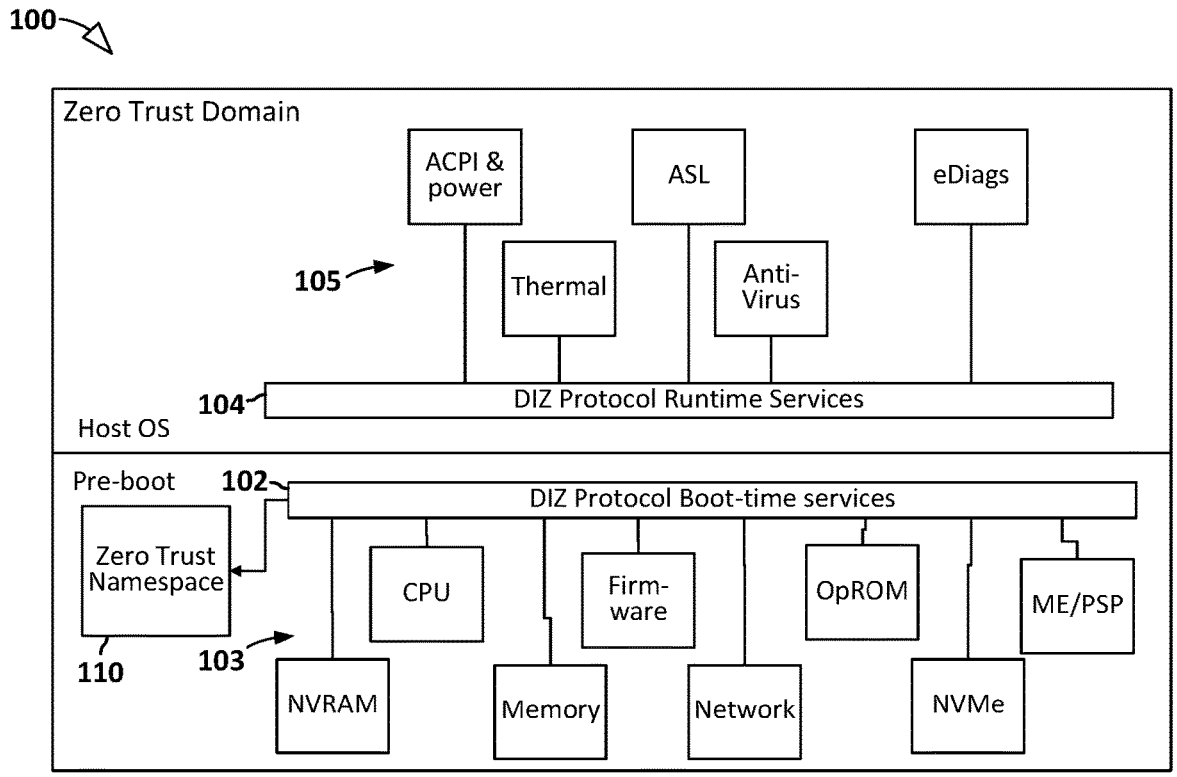
FIG. 1 illustrates a zero trust domain in accordance with disclosed teachings.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an architecture suitable for implementing a disclosed DIZ protocol 100 featuring an ability to dynamically scan platform firmware and process vulnerability reports from multiple sources for any vulnerability and perform reactive vulnerability patch management when a known vulnerability is identified or proactive vulnerability patch management when a sign of compromise is identified.

The depicted architecture illustrates pre-boot objects 103, including devices and/or software structures, accessed by DIZ protocol boot-time services 102 before an operating system (OS) is loaded and host OS objects accessed by DIZ protocol runtime services 104 during runtime, i.e., after an OS is loaded. During boot-time, the DIZ protocol may measure a trust factor (e.g., an integrity hash value) for each object 103 and store the measured value in a non-volatile store identified in FIG. 1 as zero trust namespace 110, for future evaluations. In at least some embodiments, zero trust namespace 110 contains telemetry information including all of the integrity hash values and this information is synchronized with information maintained in a cloud-resident telemetry store (not depicted in FIG. 1). The specific group of pre-boot objects 103 and runtime objects 105 illustrated in FIG. 1 is illustrative rather than limiting or exclusive. Other implementations may include more, fewer, and/or different pre-boot and/or runtime objects.

The runtime services 104 of FIG. 1 may be configured to measure one or more device trust factors after the platform boots into the host OS. In at least some implementations, these runtime trust factor measurements may be done in the factory environment before the platform is shipped to the end user. Distinct zero trust namespaces 110 may be maintained by an information handling system manufacturer or distributor for each product or for each of any suitable grouping of products, e.g., each line of business.

Figure 2:
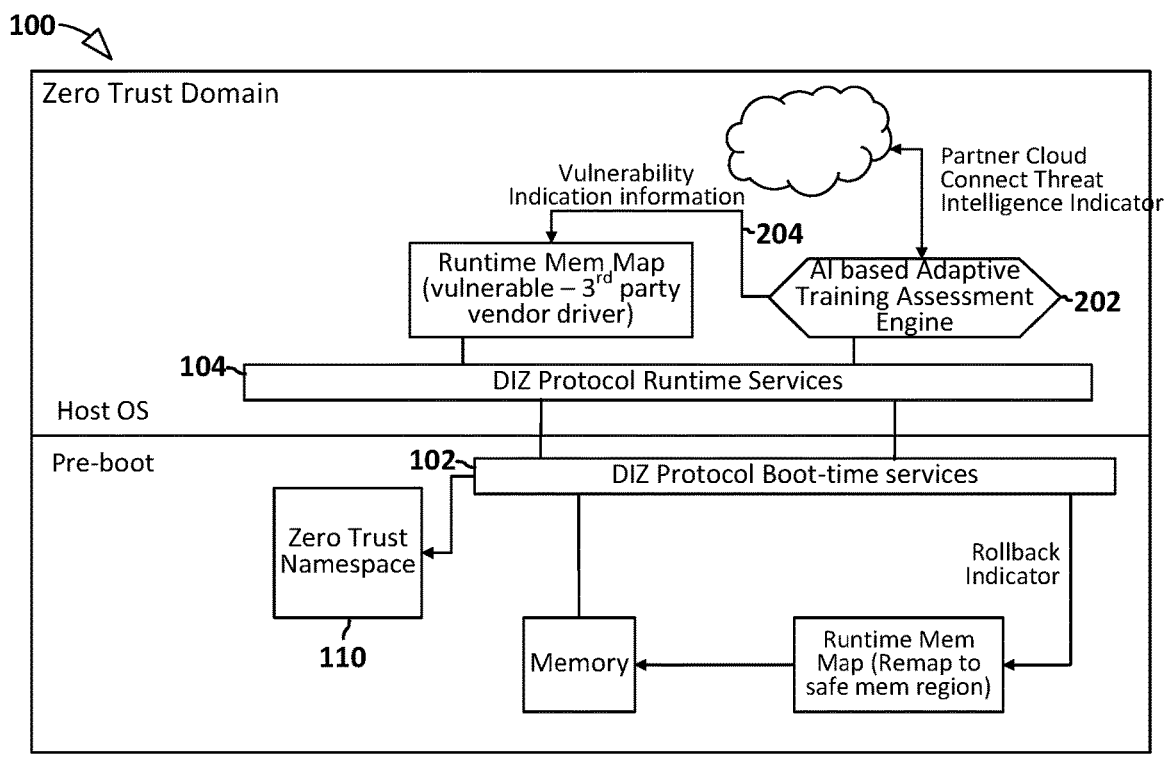
FIG. 2 illustrates SoC identification and ATA features in accordance with disclosed teachings.

Referring to FIG. 2, additional features of DIZ protocol 100 are depicted. The illustrated DIZ runtime services 104 connect with cloud-based resources, including an AI based adaptive training engine 202, to fetch vulnerability statistics, identify vulnerability response matches, take suitable action when matches are found, and publish vulnerability indication information 204. An exemplary list of vulnerability statistics might include any one or more of the following:

Telemetry indicating LOB-specific vulnerabilities and their resolutions.

software/firmware bundles from third party developers, e.g., Agile, —for latest software/firmware version and software/firmware release notes to find fix on vulnerability.

Researcher published vulnerability disclosures.

Vulnerability disclosures from silicon vendors (e.g., Intel IPU/MCU/ME/ACM & AMD PI/PSP vulnerability plan).

Third party software/firmware vendors via vulnerability disclosures and firmware updates.

Open-source components like EDK2, OpenSSL, etc.

OEM internal feature-specific vulnerability releases.

Platform-specific common code.

Industry-specific vulnerability notes from various companies.

If an end user adds new hardware to platform "RTS", i.e., after it has shipped, DIZ protocol 100 may check the trust factor of the new device and then incorporate the trust factor into zero trust namespace 110.

If an OEM learns of any specific vulnerability that lacks a corresponding vulnerability fix, the OEM may still ship the platform and create vulnerability version indicators for the vulnerability detected. If the vulnerability is deemed as a critical vulnerability, DIZ protocol 100 may look for a fix and, if a fix is available, apply the fix into the platform. If no fix is available for a critical vulnerability, at least some embodiments of the DIZ protocol 100 may advise customers not to use the feature or not include the feature in the platform.

Figure 3:
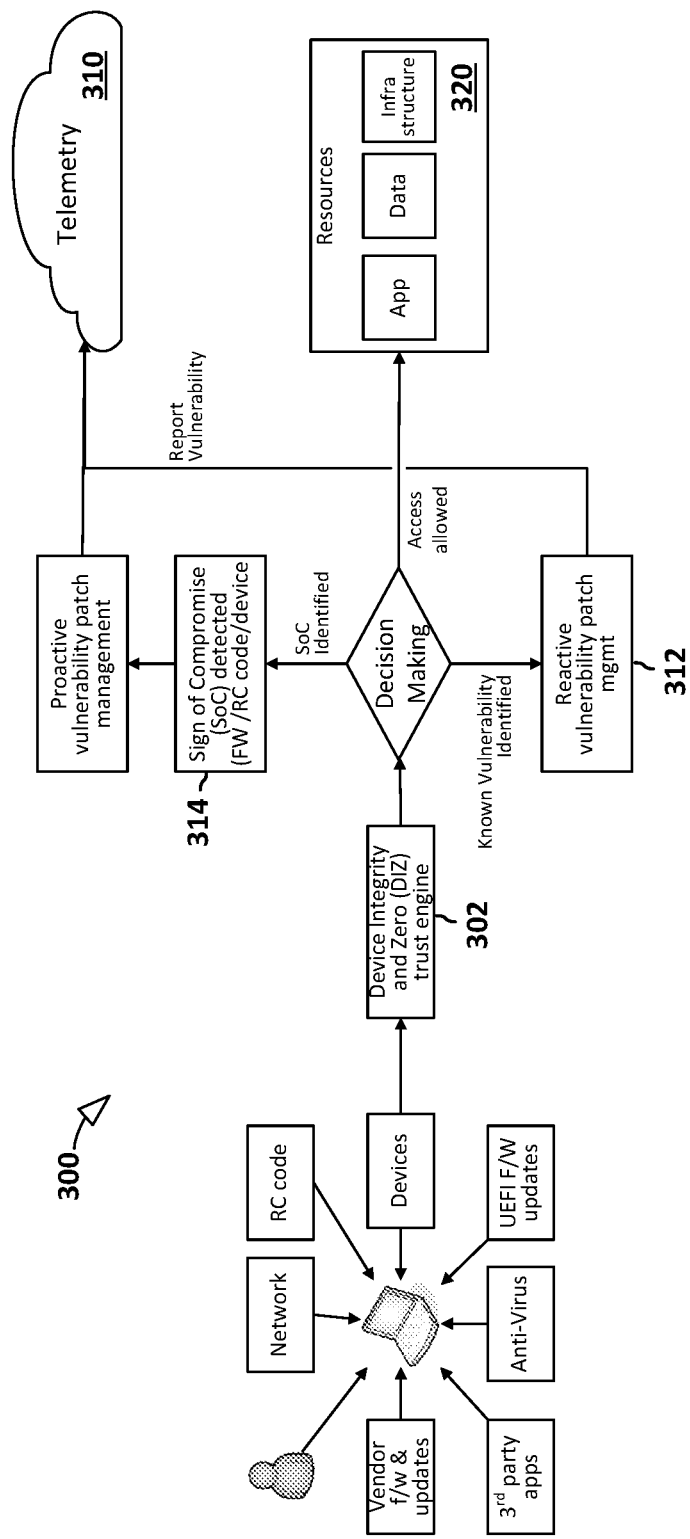
FIG. 3 illustrates end to end workflow of intelligent telemetry based indications of attack.

Referring now to FIG. 3, an illustrated solution 300 implements DIZ protocol 100 including an integrity and DIZ engine 302 to dynamically scan for and report any vulnerability to cloud based telemetry 310.

Generally, DIZ trust engine 302 may verify every access to a critical resource. A critical resource may include sensitive data, licensed applications, and enterprise infrastructure such as corporate switches, firewalls, and servers that support an organization's applications. Verification may include a security assessment of the entity attempting to access the critical resource and trust may be constantly re-evaluated. DIZ trust engine 302 may determine, as examples, whether the identity of a user is verified, whether a verified user has permission/privilege to access a resource, and what application(s) and/or service(s) are being used to connect for the access, e.g., VPN infrastructure for remote connectivity. DIZ trust engine 302 may consider how a system was booted, how the OS was loaded, and whether a device's firmware version is current. These policies may apply to managed, unmanaged, and bring-your-own devices. DIZ trust engine 302 may be configured not to assume that a vendor's update is trustworthy. OS patch levels may be checked and the presence of approved anti-virus software may be confirmed.

DIZ trust engine 302 may verify that all firmware and device-level code matches known and valid versions of code from the vendor. Additionally, DIZ trust engine 302 may automatically detect the presence of any known backdoors, implants, rootkits and other malwares. DIZ trust engine 302 may also monitor the behavior of valid code to reveal any signs of unknown threats or malware. The RC code used inside the platform should be the latest and greatest and should be free from any threats. Third party applications should have the right licensing. Once any sign of compromise is identified, DIZ trust engine 302 may treat it as a proactive threat and log the event into the telemetry store with information on the threat identified.

If DIZ trust engine 302 detects no threats or vulnerabilities, access to the resources may be granted. If any entity fails to satisfy security norms or if any known vulnerability is identified, then DIZ trust engine 302 may treat it as a known vulnerability and log the reactive vulnerability event into the telemetry.

All of the reactive and proactive threats identified by DIZ trust engine 302 may be logged to a telemetry store residing on platform servers and each entry in the log may contain information indicating the threat identified, platform type, and generation.

A scalable AI-based adaptive trust assessment (ATA) engine running continuously in the cloud may access the telemetry logs to determine, in conjunction with other inputs, which platforms/generations have an identified vulnerability. Other inputs the ATA engine may receive and incorporate into the identification of vulnerabilities include, as non-limiting examples: product security incident response team (PSIRT) and Agile reports, security vulnerabilities reported from researchers, vulnerability reports from vendors, typically including firmware and/or RC codes, device errors reported from the eDiags, etc.

If DIZ trust engine 302 identifies a known vulnerability, reactive vulnerability patch management is performed (312) and the vulnerability is reported to telemetry 310. If a sign of compromise is identified, for example, in firmware, RC code, or a device, proactive vulnerability patch management is performed (314) and, again, the vulnerability is reported to telemetry 310. If no vulnerability is identified, access to resources (320) is allowed FIG. 3 depicts end-to-end workflow of intelligent indications of attack through telemetry. The illustrated solution may run in the pre-boot environment as well as the Host-OS environment.

Figure 4:
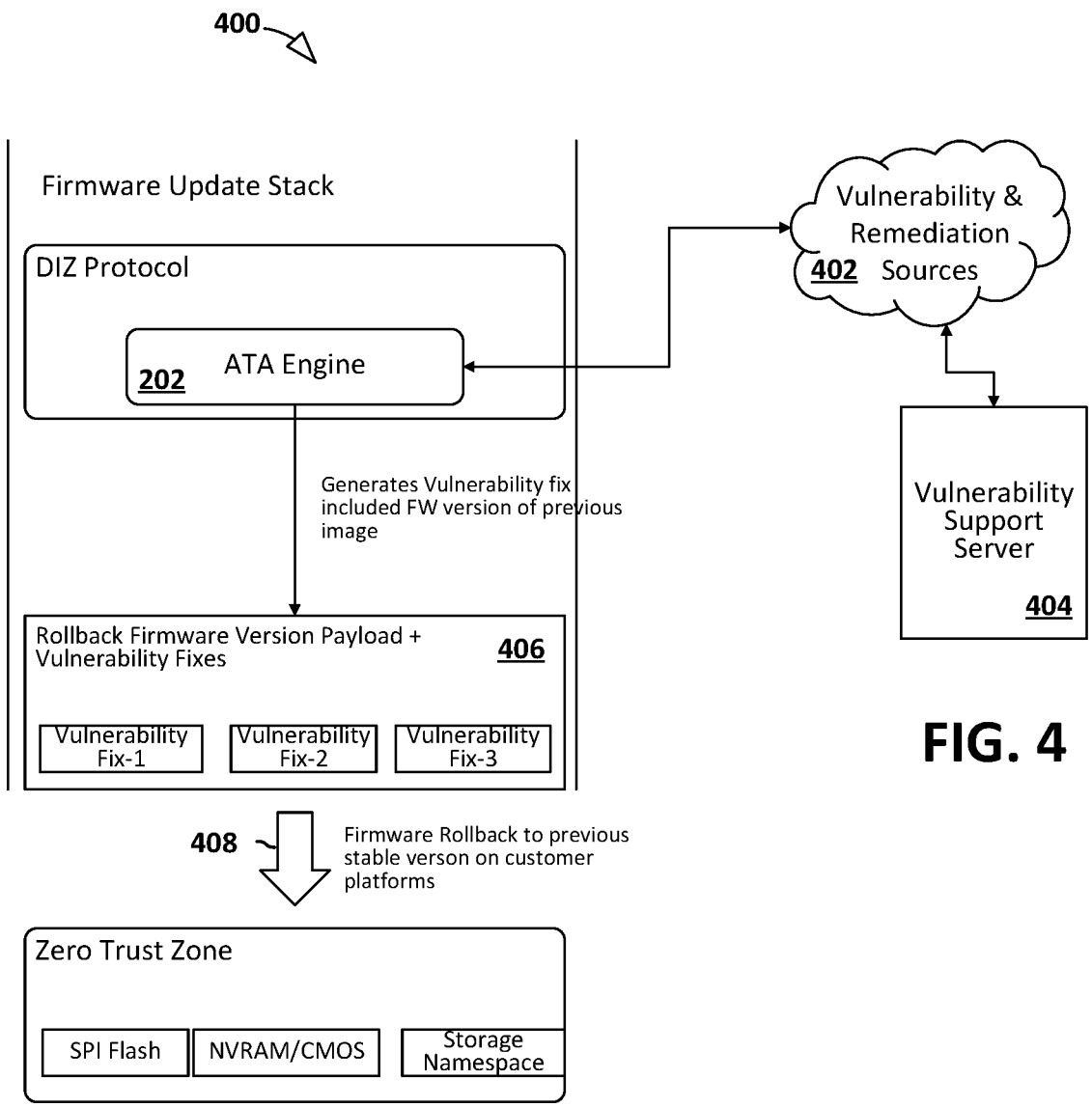
FIG. 4 illustrates disclosed features for rollback to previous customer version with vulnerability fixed.

Referring now to FIG. 4, a roll back feature 400 for rolling back to a previous version with vulnerability fixes is depicted. ATA engine 202 may be integrated with the runtime DIZ protocol to connect with cloud based Vulnerability and Remediation sources 402 to discover the SoC and available vulnerability fixes/remediation measures. When a platform runs into a hang/crash or other severe problems due to a bug in a recent update, ATA 402 may kick in and start to process the raw statistics to instruct a Vulnerability Support Server 404 to push a payload matching a previous firmware version along with the vulnerability fixes. FIG. 4 illustrate ATA engine 202 getting vulnerability fixes compiled into a previous firmware version payload 406 and updating 408 the customer platform to ensure zero trust with applied patches. This solution is strategically aligned with a sustainability objective recommending available vulnerability fixes even in rollback firmware versions.

Figure 5:
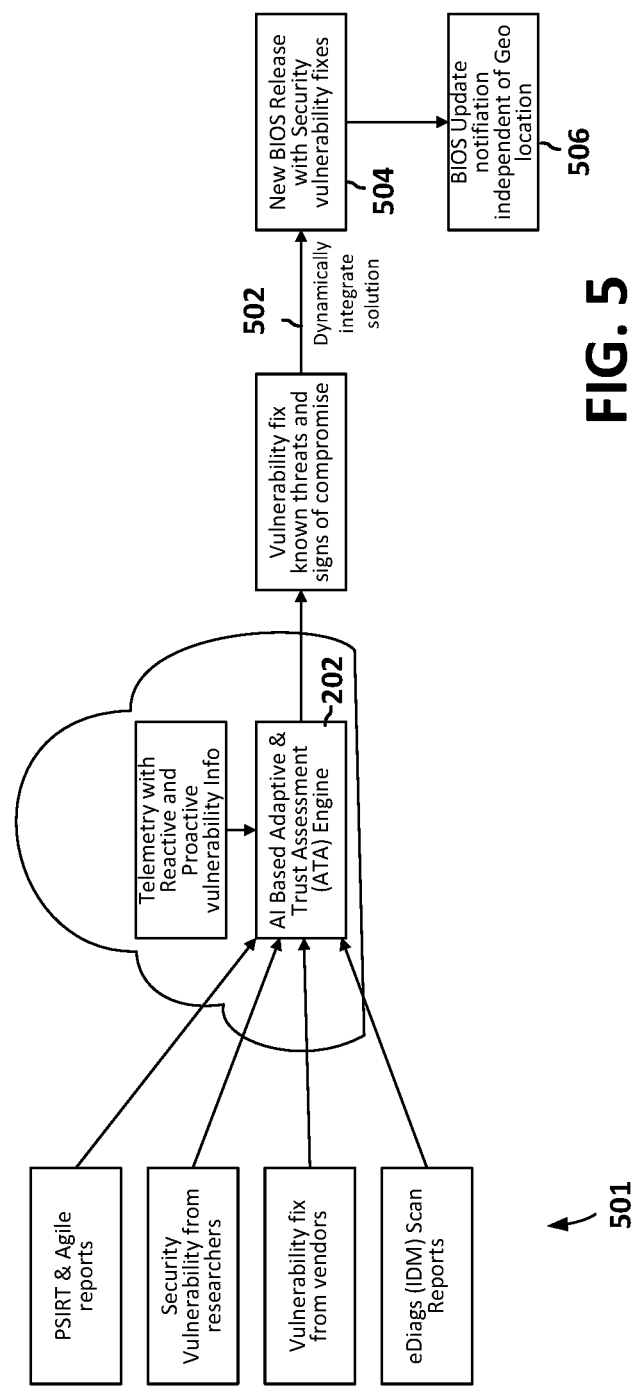
FIG. 5 illustrates AI based ATA engine for dynamic integration of vulnerability fixes.

Referring now to FIG. 5, ATA engine 202 is depicted in conjunction with features for dynamic integration of vulnerability fixes. ATA engine 202, after receiving inputs 501 from the illustrated entities, dynamically integrates vulnerability fixes for known threats, as part of reactive patch management, and also for all SoC threats, as part of proactive patch management. The patch created with vulnerability fixes for the platform and generation are dynamically integrated (502) with the platform BIOS and the new BIOS 504 is built with the help of a Jenkins job or another suitable continuous integration/delivery resource. Once the new BIOS is built, and is available for the end users, for any platform or generations, a BIOS update notification 506 may be sent to all customers, independent of geo location. Based on the notifications, the end users may update the platform BIOS to latest release with vulnerability fixes.

Figure 6:
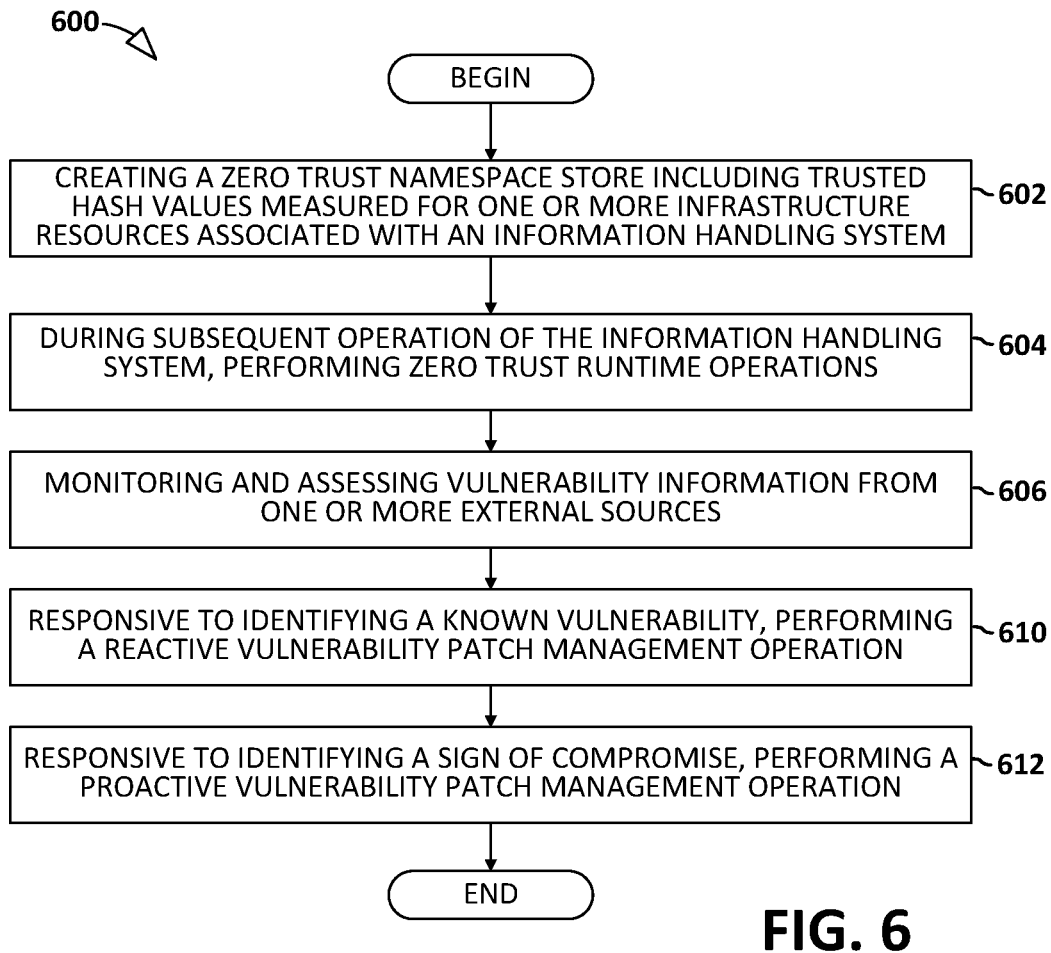
FIG. 6 illustrates a flow diagram of a vulnerability and assessment method in accordance with disclosed teachings.

Referring now to FIG. 6, a flow diagram illustrates a vulnerability assessment and management method 600 in accordance with disclosed teachings. The method 600 illustrated in FIG. 6 includes creating (step 602) a zero trust namespace store that includes trusted hash values measured for one or more infrastructure resources associated with an information handling system. During subsequent operation of the information handling system, the illustrated method performs (step 604) zero trust runtime operations. The zero trust runtime operations may include, as non-limiting examples, verifying one or more of the trusted hash values, responsive to detecting an attempt by a user to access a resource, verifying user identity and user privilege information, and monitoring vendor-provided version information for one or more firmware components and comparing the vendor-provided version information with version information included in the zero trust name space. The method 600 depicted in FIG. 6 further includes monitoring and assessing (step 606) vulnerability information from one or more external sources. Responsive to identifying a known vulnerability, the illustrated method performs (operation 610) a reactive vulnerability patch management operation. Responsive to identifying a sign of compromise, a proactive vulnerability patch management operation is performed (operation 612).

Figure 7:
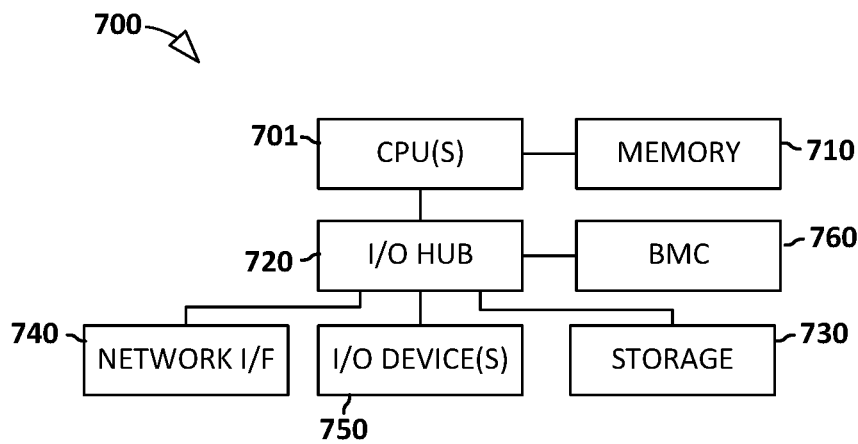
FIG. 7 illustrates an information handling system suitable for use in conjunction with disclosed teachings.

Referring now to FIG. 7, any one or more of the elements illustrated in FIG. 1 through FIG. 6 may be implemented as or within an information handling system exemplified by the information handling system 700 illustrated in FIG. 7. The illustrated information handling system includes one or more general purpose processors or central processing units (CPUs) 701 communicatively coupled to a memory resource 710 and to an input/output hub 720 to which various I/O resources and/or components are communicatively coupled. The I/O resources explicitly depicted in FIG. 7 include a network interface 740, commonly referred to as a NIC (network interface card), storage resources 730, and additional I/O devices, components, or resources 750 including as non-limiting examples, keyboards, mice, displays, printers, speakers, microphones, etc. The illustrated information handling system 700 includes a baseboard management controller (BMC) 760 providing, among other features and services, an out-of-band management resource which may be coupled to a management server (not depicted). In at least some embodiments, BMC 760 may manage information handling system 700 even when information handling system 700 is powered off or powered to a standby state. BMC 760 may include a processor, memory, an out-of-band network interface separate from and physically isolated from an in-band network interface of information handling system 700, and/or other embedded information handling resources. In certain embodiments, BMC 760 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing vulnerabilities in an information handling system, wherein the method comprises:
   maintaining a zero trust namespace store including trusted hash values measured for one or more resources of the information handling system, wherein said maintaining includes measuring, before loading an operating system (OS), pre-boot hash values of one or more pre-boot objects and storing the pre-boot hash values in the zero trust namespace store;
   during subsequent operation of the information handling system in a runtime environment, responsive to detecting an attempt by a user to access a critical resource, performing zero trust runtime operations including determining:
   whether an identity of the user has been verified;
   whether a user with a verified identity has sufficient privilege to access the critical resource;
   resources used to access the critical resource access;
   how the information handling system was booted;
   how the OS was loaded; and
   whether a firmware version, comprising a version of firmware within the information handling system, is current;
   wherein a critical resource comprises at least one of:
   licensed applications; and
   enterprise infrastructure;
   wherein determining whether a firmware version is current includes monitoring vendor-provided version information for one or more firmware components and comparing the vendor-provided version information with version information included in the zero trust namespace store.

2. The method of claim 1, further comprising:
   monitoring and assessing vulnerability information from one or more external sources;
   responsive to identifying a known vulnerability, performing a reactive vulnerability patch management operation;
   monitoring behavior of valid code to identify any sign of compromise; and
   responsive to identifying a sign of compromise, performing a proactive vulnerability patch management;
   wherein said identifying a sign of compromise includes detecting a firmware version that does not match a known and valid version.

3. The method of claim 2, wherein at least one of the reactive vulnerability patch management operation and the proactive patch management operation includes rolling back to a prior firmware version payload.

4. The method of claim 1, wherein the enterprise infrastructure includes at least one of:

an enterprise switch;
an enterprise firewall; and
a virtual private network (VPN) enabling remote connectivity to the information handling system.

5. The method of claim 1, wherein creating the zero trust namespace includes measuring the trusted hash values prior to shipping the information handling system.

6. The method of claim 1, wherein creating the zero trust namespace includes measuring, within a pre-boot environment, a hash value of one or more components of the information handling system.

7. The method of claim 1, wherein creating the zero trust namespace includes measuring, within a runtime environment, devices activated when the information handling system boots an operating system.

8. The method of claim 1, wherein the zero trust runtime operations include one or more of:
confirming a vendor provided indication of an operating system (OS) patch level with an OS patch level included in the zero trust namespace;
verifying the presence of an approved anti-virus resource; and
detecting for the presence of one or more known malware objects.

9. The method of claim 1, wherein creating a zero trust namespace includes creating a plurality of zero trust namespaces wherein each zero trust namespace corresponds to one of a plurality of business lines.

10. An information handling system, comprising:
a central processing unit (CPU); and
a memory resource, accessible to the CPU, including processor-executable instructions that, when executed by the CPU, cause the system to perform vulnerability operations comprising:
maintaining a zero trust namespace store including trusted hash values measured for one or more resources of the information handling system, wherein said maintaining includes measuring, before loading an operating system (OS), pre-boot hash values of one or more pre-boot objects and storing the pre-boot hash values in the zero trust namespace store;
during subsequent operation of the information handling system in a runtime environment, responsive to detecting an attempt by a user to access a critical resource, performing zero trust runtime operations including determining:
whether an identity of the user has been verified;
whether a user with a verified identity has sufficient privilege to access the critical resource;
resources used to access the critical resource access;
how the information handling system was booted;
how the OS was loaded; and
whether a firmware version, comprising a version of firmware within the information handling system, is current;
wherein a critical resource comprises at least one of:
licensed applications; and
enterprise infrastructure;
wherein determining whether a firmware version is current includes monitoring vendor-provided version information for one or more firmware components and comparing the vendor-provided version information with version information included in the zero trust namespace store.

11. The information handling system of claim 10, wherein the vulnerability operations further include:
monitoring and assessing vulnerability information from one or more external sources;
responsive to identifying a known vulnerability, performing a reactive vulnerability patch management operation;
monitoring behavior of valid code to identify any sign of compromise; and
responsive to identifying a sign of compromise, performing a proactive vulnerability patch management;
wherein said identifying a sign of compromise includes detecting a firmware version that does not match a known and valid version.

12. The information handling system of claim 11, wherein at least one of the reactive vulnerability patch management operation and the proactive patch management operation includes rolling back to a prior firmware version payload.

13. The information handling system of claim 10, wherein the enterprise infrastructure includes at least one of:
an enterprise switch;
an enterprise firewall; and
a virtual private network (VPN) enabling remote connectivity to the information handling system.

14. The information handling system of claim 10, wherein creating the zero trust namespace includes measuring the trusted hash values prior to shipping the information handling system.

15. The information handling system of claim 10, wherein creating the zero trust namespace includes measuring, within a pre-boot environment, a hash value of one or more components of the information handling system.

16. The information handling system of claim 10, wherein creating the zero trust namespace includes measuring, within a runtime environment, devices activated when the information handling system boots an operating system.

17. The information handling system of claim 10, wherein the zero trust runtime operations include one or more of:
confirming a vendor provided indication of an operating system (OS) patch level with an OS patch level included in the zero trust namespace;
verifying the presence of an approved anti-virus resource; and
detecting for the presence of one or more known malware objects.

18. The information handling system of claim 10, wherein creating a zero trust namespace includes creating a plurality of zero trust namespaces wherein each zero trust namespace corresponds to one of a plurality of business lines.

* * * * *